United States Patent Office 3,214,449
Patented Oct. 26, 1965

3,214,449
OXIDATION PROCESS FOR PREPARING
A BORATE ESTER
Isidor Kirshenbaum, Westfield, and Jeffrey H. Bartlett, New Providence, N.J., and Ralph M. Hill, Mayfair, London, England, assignors to Esso Research and Engineering Company, a corporation of Delaware
No Drawing. Filed Mar. 28, 1962, Ser. No. 183,016
5 Claims. (Cl. 260—406)

This application is a continuation-in-part of co-pending application, now abandoned, Serial No. 860,320, filed December 18, 1959.

This invention relates to a novel technique for selectively increasing the functionality of organic compounds which contain one or more functional groups, especially where these groups are oxygen sensitive.

In particular, this invention relates to a novel process wherein the functionality of a $C_2$ to $C_{30}$ organic compound containing at least one functional group is increased by reacting such compounds with molecular oxygen in the presence of a boric acid compound.

The term "boric acid compound" is used herein to designate boric acid, i.e. $H_3BO_3$, and boron containing compounds which generate boric acid upon contact with water, e.g. boric oxide, i.e. $B_2O_3$; borate esters, e.g. trimethylborate, triethylborate, tributylborate, etc.; alkylboric acids, i.e. $R_2BOH$ (borinic acids) and $RB(OH)_2$ (boronic acids) wherein R is an alkyl radical, preferably a $C_3$–$C_8$ alkyl radical; and the esters of boronic and borinic acids with $C_1$ to $C_4$ alcohols. Of these trimethylborate is preferred. For an explanation of the properties of the aforementioned boric acid compounds, see "The Chemistry of Organometallic Compounds," Rochow, Hurd and Lewis, 1957, by John Wiley and Sons, New York and London, pages 127–129.

One object of this invention is to provide a simple technique for introducing oxygen into the molecular structure of an organic compound containing at least one $CH_2$ group and one or more functional groups without substantially affecting the nature or decreasing the numbers of functional groups already existing in such compounds.

In one embodiment of this invention one or more hydroxyl groups are introduced into carboxylic acids or esters thereof, such as those derived from vegetable or animal fats and oils, caproic acid, derivatives of alkylated aromatics such as the methyl ester of p-toluic acid and petroleum derived acids such as naphthenic acids as well as polybasic acids, including dicarboxylic acids such as glutaric and esters thereof.

In a broader sense, the organic feed materials suitable for this boric acid oxidation may comprise carboxylic acids, alkyl esters of carboxylic acids, halogenated hydrocarbons, organic nitriles and ketones. More particularly, the preferred feedstocks for this process include aliphatic $C_2$–$C_{30}$ alkanoic acids, such as hexanoic, octanoic, dodecanoic, stearic, lauric and similar carboxylic acids. Preferably $C_8$ to $C_{18}$ alkanoic acids and their lower alkyl esters are employed. Similar molecular weight alkane nitriles such as butane nitrile, hexane nitrile, nonane nitrile, dodecane nitrile, hexadecane nitrile and the like are useful in this process. Preferably $C_8$ to $C_{16}$ alkane nitriles are used. Ketones employable include methyl isobutyl ketone, ethyl hexyl ketone, methyl octyl ketone, and in general all dialkyl ketones having a total carbon number up to about $C_{30}$ and preferably from $C_6$ to $C_{16}$. The halogenated hydrocarbons suitable for this reaction are preferably chlorinated $C_2$–$C_{30}$ paraffins such as chloro-octane, chloro-dodecane and the like. Di and trihaloalkanes may be employed if desired.

In ordinary liquid phase oxidation of organic compounds which contain functional groups such as $>C=O$, —COOH, —COOR, —CN, etc., many side reactions ordinarily develop creating a smear of various oxidation products. Most often the point of attack of the incoming oxygen is on or near the most sensitive functional groups, resulting in a destruction of the oxygen containing or other oxidation-sensitive substituent.

It has now been discovered that organic compounds containing such functional groups, including oxidation-sensitive groups as described above, can be selectively oxidized to introduce additional functional groups without substantially disturbing the basic structure of the feed material by reacting such organic compounds with molecular oxygen in the presence of the aforementioned boron compounds.

The oxygen gas may be introduced in its undiluted form or it may be diluted with an inert gas such as nitrogen. Thus air may serve as the oxidant or a nitrogen-oxygen mixture containing less oxygen than that normally found in air may be employed. Other inert gases may be substituted for the nitrogen. In a preferred embodiment the oxidizing gas contains 3 to 6 vol. percent oxygen and correspondingly 97 to 94 vol. percent nitrogen or other inert gases.

The amount of boric acid employed in this process may vary somewhat, depending upon the feedstock and the end product desired. In general, the amount of boric acid employed should be in excess of the amount that would be stoichiometrically equivalent to the number of hydroxyl groups to be introduced. Since the preferred embodiment of this invention it is generally desirable to effect only partial conversion in a single pass operation (although recycle and multi-stage operation are within the scope of the invention) the amount of boric acid added to the reaction mixture in such operation will be generally less than stoichiometric requirements for 100% conversion. Thus, the amount $H_3BO_3$ emplyoed for the oxidation of a carboxylic acid, for example, should preferably be in the range of about 0.05–0.25 mole of $H_3BO_3$ per mole of carboxylic acid being fed to the reactor. When using the other boron compounds disclosed herein, a chemically equivalent amount is used. It should be understood that 1 mole of $H_3BO_3$, a tribasic acid, is considered as constituting three chemical equivalents. The same is true of the borate esters hereinbefore mentioned. Broadly speaking, the present invention gives useful results when employing concentrations of $H_3BO_3$ which fall in the range of about 0.02 to 3.0, preferably 0.05 to 0.5 mole of $H_3BO_3$ per mole of organic feedstock exclusive of diluent.

The use of the higher portion of this range is particularly of interest when comparatively large quantities of inert diluent are employed. It is within the scope of this invention to carry out the oxidation reactions of the organic compounds in the presence of an inert diluent or solvent such as benzene, chlorobenzene, dichlorobenzene, bromobenzene, etc. Other inert diluents may be used such as carbon tetrachloride.

Likewise the temperaure and pressure employed with this technique will vary somewhat with the particular reaction contemplated. However, in general, the process may be conducted at temperatures in the range of 100° to 250° C., preferably 150° to 185° C. and pressures ranging from about atmospheric or below to 200 atmospheres or higher, preferably atmospheric to 50 atmospheres.

The oxidation of organic compounds containing functional groups in the presence of boric acid (or other boron compounds hereinbefore disclosed) usually introduces the oxygen into the organic compounds in the form of a borate ester of the alcohol. The increased selectivity to be observed may at first be thought to be introducing an OH group into the organic molecule and then immediately esterifying to avoid further reaction. This simple explanation is not satisfactory from the fact that the use of acetic acid or phosphoric acid in place of boric acid does not result in the selective process described in this invention.

The borate ester of the product may be converted to the corresponding hydroxy substituted compound by reaction with water or preferably with a lower molecular alcohol, e.g. $C_1$–$C_3$ alcohol, preferably methanol. This ester interchange reaction, especially when using methanol, is a preferred method of recovering the boric acid or derivative thereof from the reaction mixture. When the ester interchange reaction with methanol is used, trimethylborate may be recovered with an azeotrope, boiling point 54.8 C. (769 mm. Hg) and containing 26.1 wt. percent methanol.

The invention may be more easily understood by considering a few of the individual embodiments thereof.

SYNTHESIS OF HYDROXY ACIDS

Air oxidation in liquid phase of stearic acid or ester thereof in the presence of boric acid or derivative thereof introduces one or more hydroxyl groups along the chain. Other acids especially those in the $C_{10}$–$C_{30}$ range when oxidized under the conditions of this invention become suitable for use in alkyd resins, plasticizers, etc. Branched acids such those derived from olefins may be oxidized by the process of this invention. Acids of this type include those prepared by the well-known Oxo process wherein olefins are reacted with hydrogen and carbon monoxide at a temperature in the range of about 70° to 200° C. under a pressure of between 100 and 300 atmospheres in the presence of a metal-containing carbonylation catalyst, e.g. cobalt acetate or oleate, to convert the olefin to an aldehyde which in turn is oxidized to produce the corresponding acid. Suitable acids also include those prepared by reacting an olefin with carbon monoxide oxide similar pressures in the presence of an acid catalyst, e.g., $BF_3 \cdot 2H_2O$, $H_3PO_4$—$BF_3$—$M_2O$, conc. $H_2SO_4$ and $H_2SO_4$—$BF_3$—$H_2O$ at lower temperatures, e.g. 25°–40° C., etc. In the latter process water may be present in the reaction zone or the reaction product may be hydrolyzed later.

Example 1

A $C_{17}$ hydroxy acid is prepared by first esterifying steric acid $C_{17}H_{35}COOH$ with methanol to form methyl stearate. 900 grams of methyl stearate are then mixed with 30 grams of $H_3BO_3$ and reacted with a nitrogen air mixture containing about 8 vol. percent $O_2$ at 170° C. which is bubbled through the mixture. During the reaction water is continuously removed via the exit gas. After a conversion of 25% is reached the oxidation is terminated and the reaction product mixture is treated with methanol to transesterify the hydroxy stearate ester of boric acid and to liberate the free hydroxy substituted methyl stearate. The resultant products are distilled to remove excess methanol and methyl borate. Analysis of the residue reveals substantial conversion of the stearic acid to the methyl ester of hydroxy stearic acid.

Example 2

The procedure of Example 1 is repeated employing stearic acid in lieu of the methyl stearate.

Example 3

288 grams of caprylic acid are contacted with 15 grams of boric acid, the mixture being heated to a temperature of 140°–150° C. Straight air is then bubbled through the reaction mixture at this temperature for a period of time sufficient to convert 25% of the caprylic acid to oxidation products thereof. The resultant oxidation product which will contain principally the borate ester of hydroxy caprylic acid is then hydrolyzed by contact with water and the resultant free hydroxy caprylic acid is recovered by fractionation.

Example 4

Methyl heptyl ketone is converted to methyl hydroxy heptyl ketone as in the previous example employing 284 grams of methyl heptyl ketone reactant and 15 grams of boric acid with air oxidation at 140°–150° C. for a period of 4 hours.

Example 5

The procedure outlined in the prior examples is followed with 1-chlorodecane, 400 grams of which are reacted with air for 4 hours in the presence of 53 grams of boric acid at 140°–150° C.

Example 6

A commercial mixture of alkane nitriles identified as Arneel–14D (Armour) is oxidized in the presence of boric acid. This nitrile mixture contains 87% of n-$C_{14}$ alkane nitrile, the remainder being mixed higher molecular weight nitriles up to about $C_{18}$ with about 3% impurities. 200 grams of this commercial nitrile mixture is reacted with straight air in the presence of 10 grams of boric acid at 140°–150° C. until a conversion of 30% is reached. Product workup is carried out as indicated previously to effect the recovery of hydroxy alkane nitriles.

The term "air oxidation" is used herein to designate an oxidation process wherein the source of oxygen is a gas consisting essentially of a mixture of an inert gas and molecular oxygen.

The term "inert gas" is used herein to designate a gas that does not react with or catalyze reactions between organic compounds and boric acid compounds and is inert to oxidation at the conditions of reaction herein set forth.

All percentages herein shall be construed to mean percentage by weight unless otherwise indicated.

It should be understood that the boric acid compound must be present in a readily reactive form. Thus, it may be present as a substance which is a liquid at the reaction conditions, a finely divided solid, or in solution. Fused boric acid compounds, e.g. fused boric oxide, are not satisfactory.

What is claimed is:

1. A process for preparing a borate ester substituted aliphatic $C_2$ to $C_{30}$ alkanoic acid which comprises reacting an aliphatic $C_2$ to $C_{30}$ alkanoic acid with molecular oxygen at a temperature in the range of 100° to 250° C. in the presence of a boron compound which provides boric acid upon contact with water, said boron compound being selected from the group consisting of boric acid, boric oxide, lower alkyl borate ester and alkyl boric acid, said boron compound being present in a concentration of about 0.02 to 3.0 moles per mole of said aliphatic alkanoic acid and recovering a borate ester substituted alkanoic acid.

2. A process in accordance with claim 1 wherein said feed material is a $C_8$ to $C_{18}$ alkanoic acid.

3. A process for preparing a borate ester substituted alkyl ester of an aliphatic $C_2$ to $C_{30}$ alkanoic acid which comprises oxidizing a lower alkyl ester of an aliphatic $C_2$ to $C_{30}$ alkanoic acid with molecular oxygen at a temperature in the range of 100° to 250° C. in the presence of a boron compound which provides boric acid upon contact with water, said boron compound being selected from the group consisting of boric acid, boric oxide, lower alkyl borate ester, and alkyl boric acid, said boron compound being present in a concentration of about 0.02 to 3.0 moles per mole of said lower alkyl ester of an aliphatic alkanoic acid and recovering a borate ester substituted lower alkyl ester of an aliphatic alkanoic acid.

4. A process in accordance with claim 3 wherein said feed material is a lower alkyl ester of a $C_8$ to $C_{18}$ carboxylic acid.

5. A process for preparing a borate ester substituted $C_6$ to $C_{16}$ dialkyl ketone which comprises oxidizing a $C_6$ to $C_{16}$ dialkyl ketone with molecular oxygen at a temperature in the range of 100° to 250° C. in the presence of a boron compound which provides boric acid upon contact with water, said boron compound being selected from the group consisting of boric acid, boric oxide, lower alkyl borate ester and alkyl boric acid, said boron compound being present in a concentration of about 0.02 to 3.0 moles per mole of said $C_6$ to $C_{16}$ dialkyl ketone and recovering said borate esters substituted dialkyl ketone.

References Cited by the Examiner

UNITED STATES PATENTS

| | | | |
|---|---|---|---|
| 1,947,989 | 2/34 | Hellthaler et al. | 260—462 X |
| 3,042,661 | 7/62 | Kirshenbaum et al. | 260—462 |
| 3,061,626 | 10/62 | Pearson et al. | 260—462 |
| 3,076,013 | 1/63 | Liao et al. | 260—462 |

OTHER REFERENCES

Bashkirov: Chem. Abstracts, volume 51, page 4027 (1957).

CHARLES B. PARKER, *Primary Examiner.*
LEM D. ROSDOL, *Examiner.*